United States Patent
Krishtal et al.

(10) Patent No.: US 10,469,394 B1
(45) Date of Patent: Nov. 5, 2019

(54) METHODS FOR CONFIGURING ADAPTIVE RATE LIMIT BASED ON SERVER DATA AND DEVICES THEREOF

(71) Applicant: F5 Networks, Inc., Seattle, WA (US)

(72) Inventors: Vadim Krishtal, Tel Aviv (IL); Peter Finkelshtein, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 15/665,670

(22) Filed: Aug. 1, 2017

Related U.S. Application Data (60) Provisional application No. 62/369,618, filed on Aug. 1, 2016.

(51) Int. Cl.
*H04L 12/825* (2013.01)
*H04L 12/801* (2013.01)

(52) U.S. Cl.
CPC .............. *H04L 47/25* (2013.01); *H04L 47/12* (2013.01)

(58) Field of Classification Search
USPC .............. 370/229–235, 235.1, 249, 389, 252
See application file for complete search history.

(56) References Cited

U.S. PATENT DOCUMENTS

| | | |
|---|---|---|
| 6,393,474 B1 | 5/2002 | Eichert et al. |
| 6,505,244 B1 | 1/2003 | Natarajan et al. |
| 6,578,076 B1 | 6/2003 | Putzolu |
| 6,738,933 B2 | 5/2004 | Fraenkel et al. |
| 7,072,800 B1 | 7/2006 | Fernandez et al. |
| 7,581,019 B1 * | 8/2009 | Amir ................... H04L 47/10 370/235 |
| 7,720,954 B2 | 5/2010 | Raja et al. |
| 7,769,860 B1 | 8/2010 | Assadzadeh |
| 8,230,055 B2 | 7/2012 | Kondamuru et al. |
| 8,612,612 B1 | 12/2013 | Dukes et al. |
| 9,497,106 B2 | 11/2016 | Khanal et al. |
| 9,535,775 B2 | 1/2017 | Huang et al. |
| 9,930,013 B2 | 3/2018 | Ossipov |
| 2002/0052928 A1 | 5/2002 | Stern et al. |
| 2002/0194317 A1 | 12/2002 | Kanada et al. |
| 2003/0018760 A1 | 1/2003 | Putzolu et al. |
| 2003/0065762 A1 | 4/2003 | Stolorz et al. |

(Continued)

OTHER PUBLICATIONS

BIG-IP® Application Security Manager™: Implementations, Version 12.0, Mar. 11, 2016, F5 Networks, Inc.

(Continued)

*Primary Examiner* — Brenda H Pham
(74) *Attorney, Agent, or Firm* — Pepper Hamilton LLP (57) ABSTRACT

A method, non-transitory computer readable medium and device that assist with configuring adaptive rate limit based on server health and statistics includes obtaining server health data and a current response transmission rate associated with one of the plurality of servers. An adaptive rate limit is determined based on the obtained server health data and the current response transmission rate. An actual rate and the determined adaptive rate limit is compared to determine when the actual rate of transmission is greater than the determined adaptive rate limit. A plurality of network data packets is transmitted at the determined adaptive rate limit when the actual rate of transmission is determined to be greater than the determined adaptive rate limit.

20 Claims, 4 Drawing Sheets

(56) References Cited

U.S. PATENT DOCUMENTS

| | | |
|---|---|---|
| 2004/0165575 A1* | 8/2004 | Yang .................... H04L 1/0002 |
| | | 370/349 |
| 2005/0071449 A1 | 3/2005 | Alex et al. |
| 2005/0132068 A1 | 6/2005 | Rajamony |
| 2007/0208839 A1 | 9/2007 | Voigt et al. |
| 2008/0288621 A1 | 11/2008 | Snell et al. |
| 2011/0264736 A1 | 10/2011 | Zuckerberg et al. |
| 2012/0226802 A1 | 9/2012 | Wu et al. |
| 2012/0331160 A1 | 12/2012 | Tremblay et al. |
| 2013/0315066 A1* | 11/2013 | Xu .................... H04W 28/0289 |
| | | 370/236 |
| 2014/0136676 A1 | 5/2014 | Chow et al. |
| 2014/0019605 A1 | 6/2014 | Boberg et al. |
| 2014/0229595 A1 | 8/2014 | Burke et al. |
| 2014/0372581 A1 | 12/2014 | McLeish et al. |
| 2015/0263959 A1 | 9/2015 | Patwardhan et al. |
| 2015/0319270 A1 | 11/2015 | Roeland et al. |
| 2016/0142373 A1 | 5/2016 | Ossipov |
| 2016/0261478 A1 | 9/2016 | Navasivasakthivelsamy et al. |

OTHER PUBLICATIONS

BIG-IP® TMOS®: Implementations, Version 12.0, Dec. 21, 2015, F5 Networks, Inc.
BIG-IP® Local Traffic Manager™: Implementations, Version 12.0, May 24, 2016, F5 Networks, Inc.

\* cited by examiner

METHODS FOR CONFIGURING ADAPTIVE RATE LIMIT BASED ON SERVER DATA AND DEVICES THEREOF

This application claims the benefit of U.S. Provisional Patent Application Ser. No. 62/369,618, filed on Aug. 1, 2016 which is hereby incorporated by reference in its entirety.

FIELD

This technology generally relates to methods and devices for network traffic management and, more particularly, to methods for configuring adaptive rate limit based on server data and devices thereof.

BACKGROUND

A denial of service (DoS) or distributed denial of service (DDOS) attack is an explicit attempt by an attacker or attackers to prevent or impair the legitimate use of a host computer, a router, a server, a network or the like. While such attacks can be launched from within a target network itself, the overwhelming majority of such attacks are launched from external systems and networks connected to the target via the Internet.

Traditional methods for detecting DoS attacks are typically based on monitoring incoming traffic and detecting the DoS attack based on an observation of a large increase in traffic, especially when a large portion of the traffic originates from a single IP address. In this case, mitigating the DoS attack includes filtering out the traffic associated with any IP addresses identified as malicious. However, the aforementioned technique for mitigating a DOS attack may not be very effective in mitigating a Distributed Denial of Service (DDoS) attack. In case of a DDoS attack, incoming traffic may originate from a large number of attacking machines, each having a distinct IP address.

SUMMARY

A method for configuring adaptive rate limit based on server health and statistics includes obtaining server health data and a current response transmission rate associated with one of the plurality of servers. An adaptive rate limit is determined based on the obtained server health data and the current response transmission rate. An actual rate and the determined adaptive rate limit is compared to determine when the actual rate of transmission is greater than the determined adaptive rate limit. A plurality of network data packets are transmitted at the determined adaptive rate limit when the actual rate of transmission is determined to be greater than the determined adaptive rate limit.

A non-transitory computer readable medium having stored thereon instructions for configuring adaptive rate limit based on server health and statistics comprising machine executable code which when executed by at least one processor, causes the processor to perform steps includes obtaining server health data and a current response transmission rate associated with one of the plurality of servers. An adaptive rate limit is determined based on the obtained server health data and the current response transmission rate. An actual rate and the determined adaptive rate limit is compared to determine when the actual rate of transmission is greater than the determined adaptive rate limit. A plurality of network data packets are transmitted at the determined adaptive rate limit when the actual rate of transmission is determined to be greater than the determined adaptive rate limit.

A network traffic manager apparatus including one or more processors coupled to a memory and configured to be capable of executing programmed instructions comprising and stored in the memory to obtaining server health data and a current response transmission rate associated with one of the plurality of servers. An adaptive rate limit is determined based on the obtained server health data and the current response transmission rate. An actual rate and the determined adaptive rate limit is compared to determine when the actual rate of transmission is greater than the determined adaptive rate limit. A plurality of network data packets are transmitted at the determined adaptive rate limit when the actual rate of transmission is determined to be greater than the determined adaptive rate limit.

This technology provides a number of advantages including providing methods, non-transitory computer readable media and apparatuses that effectively assist with configuring adaptive rate limit based on server health and statistics. Using the techniques illustrated below, the technology is able to ensure that the ingress data packets rate does not exceed the server capacity thereby protecting the server against DoS/DDOS attacks.

DETAILED DESCRIPTION

Figure 1:
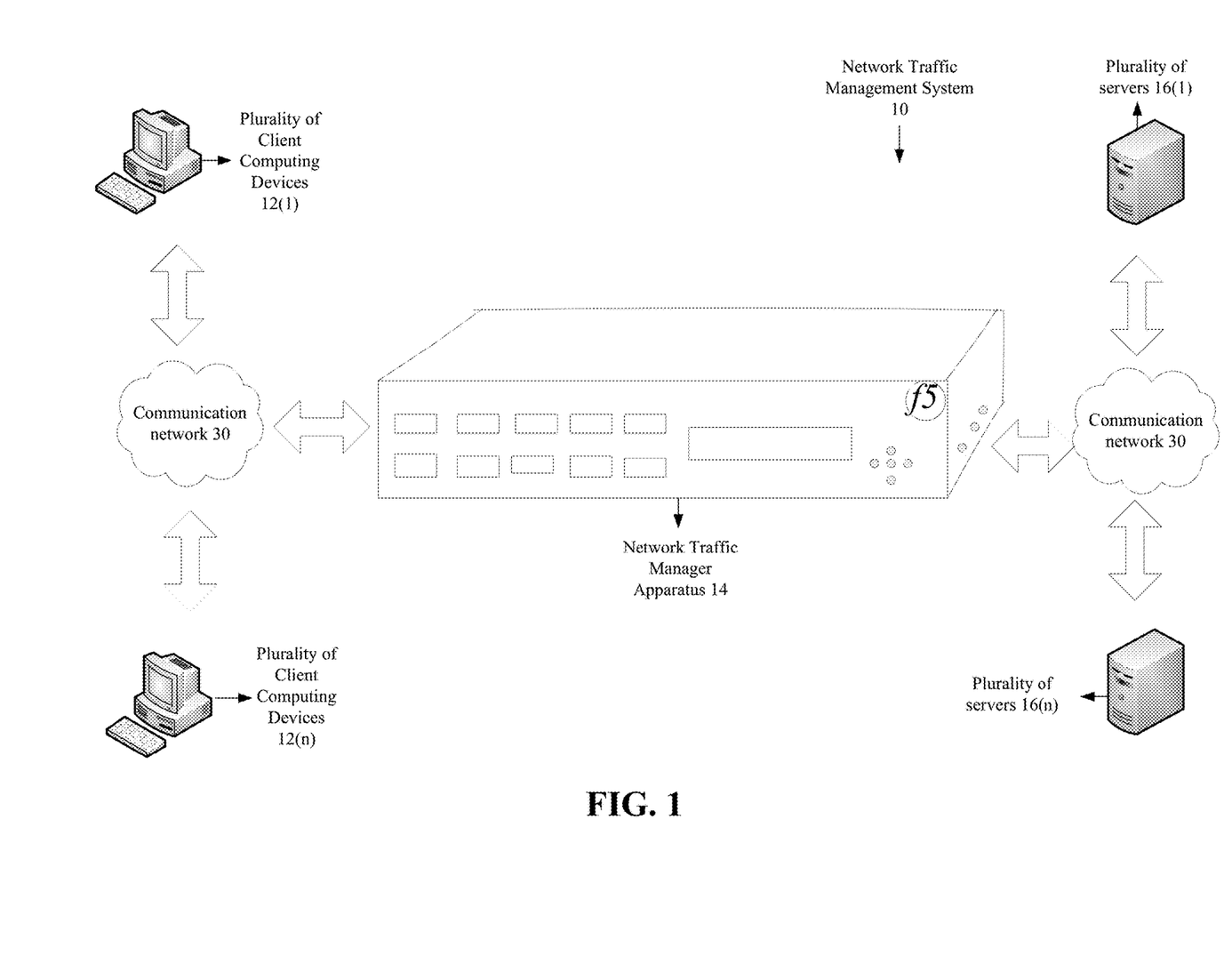
FIG. 1 is an example of a block diagram of an environment including a network traffic manager apparatus for configuring adaptive rate limit based on server health and statistics.
Figure 2:
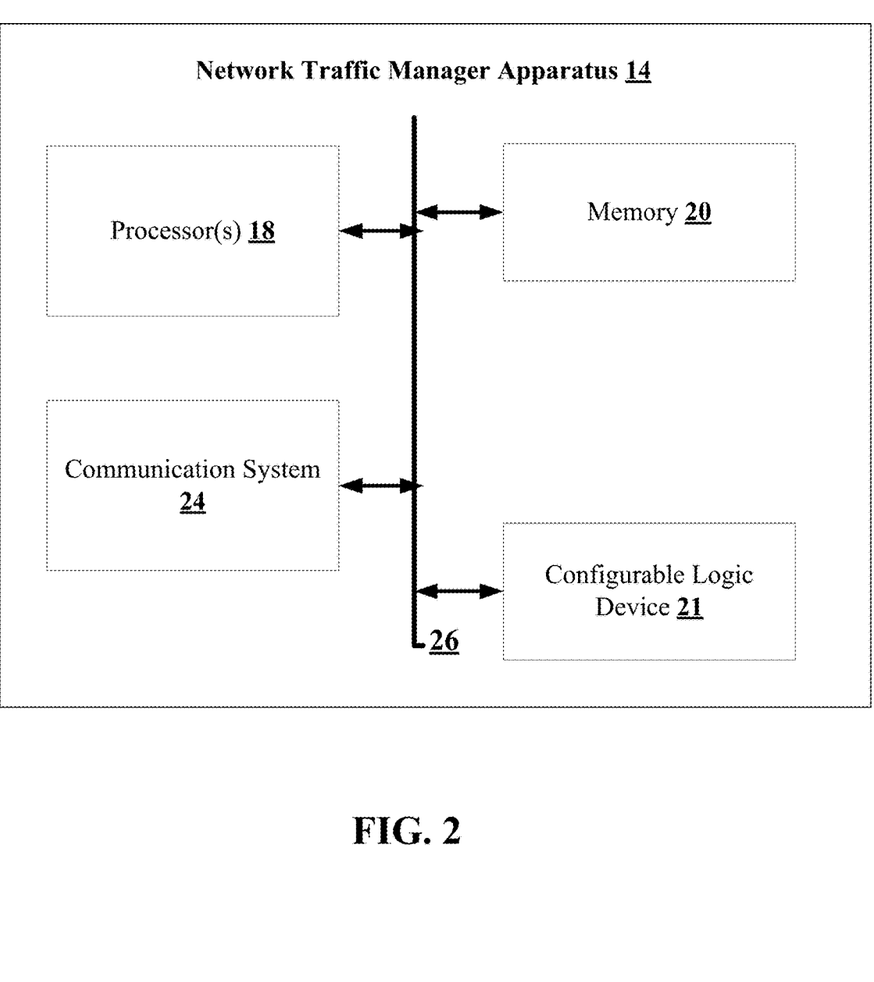
FIG. 2 is an example of a block diagram of the network traffic manager apparatus.

An example of a network environment 10 which incorporates a network traffic management system for configuring adaptive rate limit based on server health and statistics with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including configuring adaptive rate limit based on server health and statistics.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the web application servers 16(1)-16(n) and the network traffic manager apparatus 14 may be coupled together via other topologies.

The network traffic manager apparatus 14 assists with configuring adaptive rate limit based on server health and statistics as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
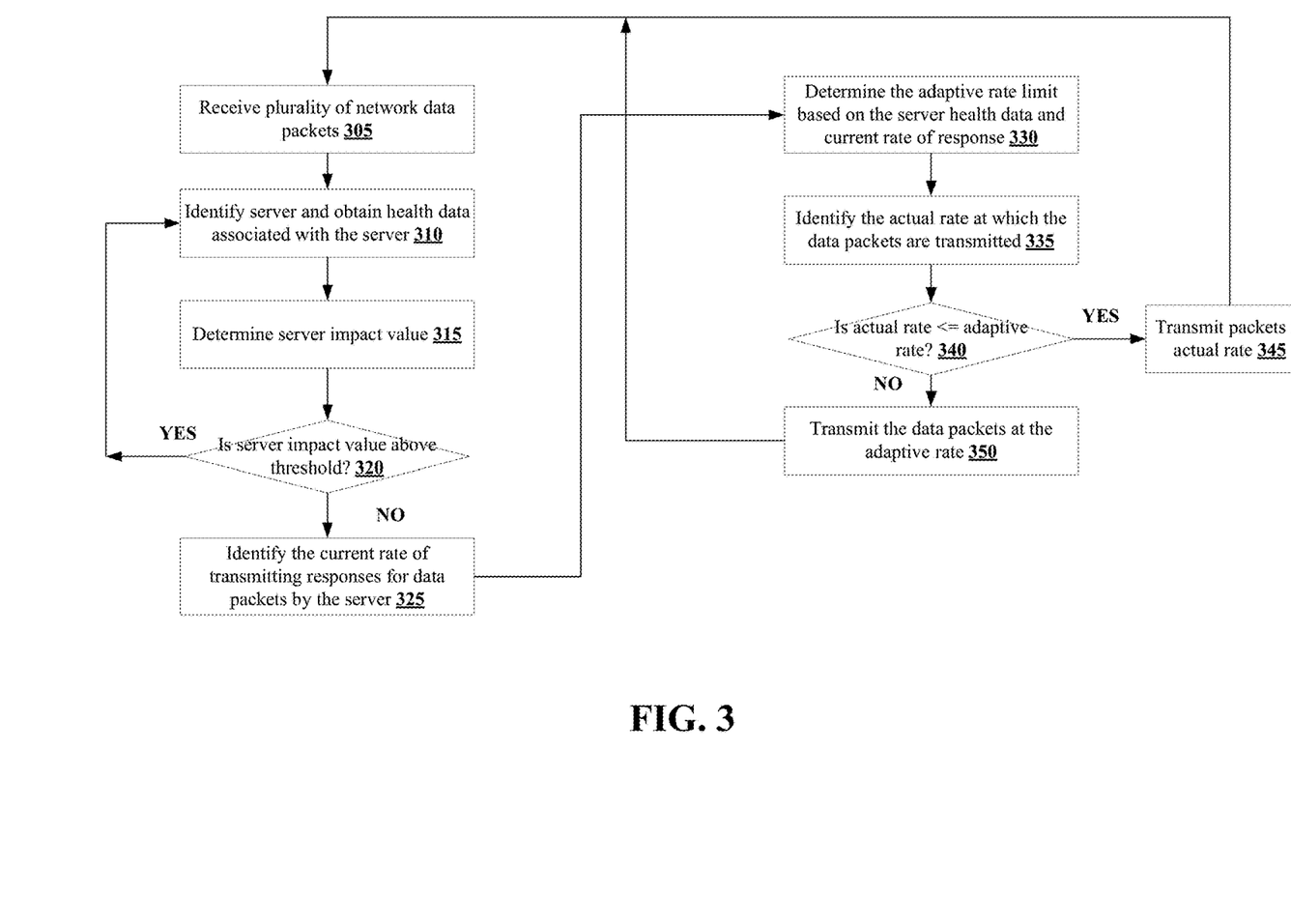
FIG. 3 is an exemplary flowchart of a method for configuring adaptive rate limit based on server health and statistics.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
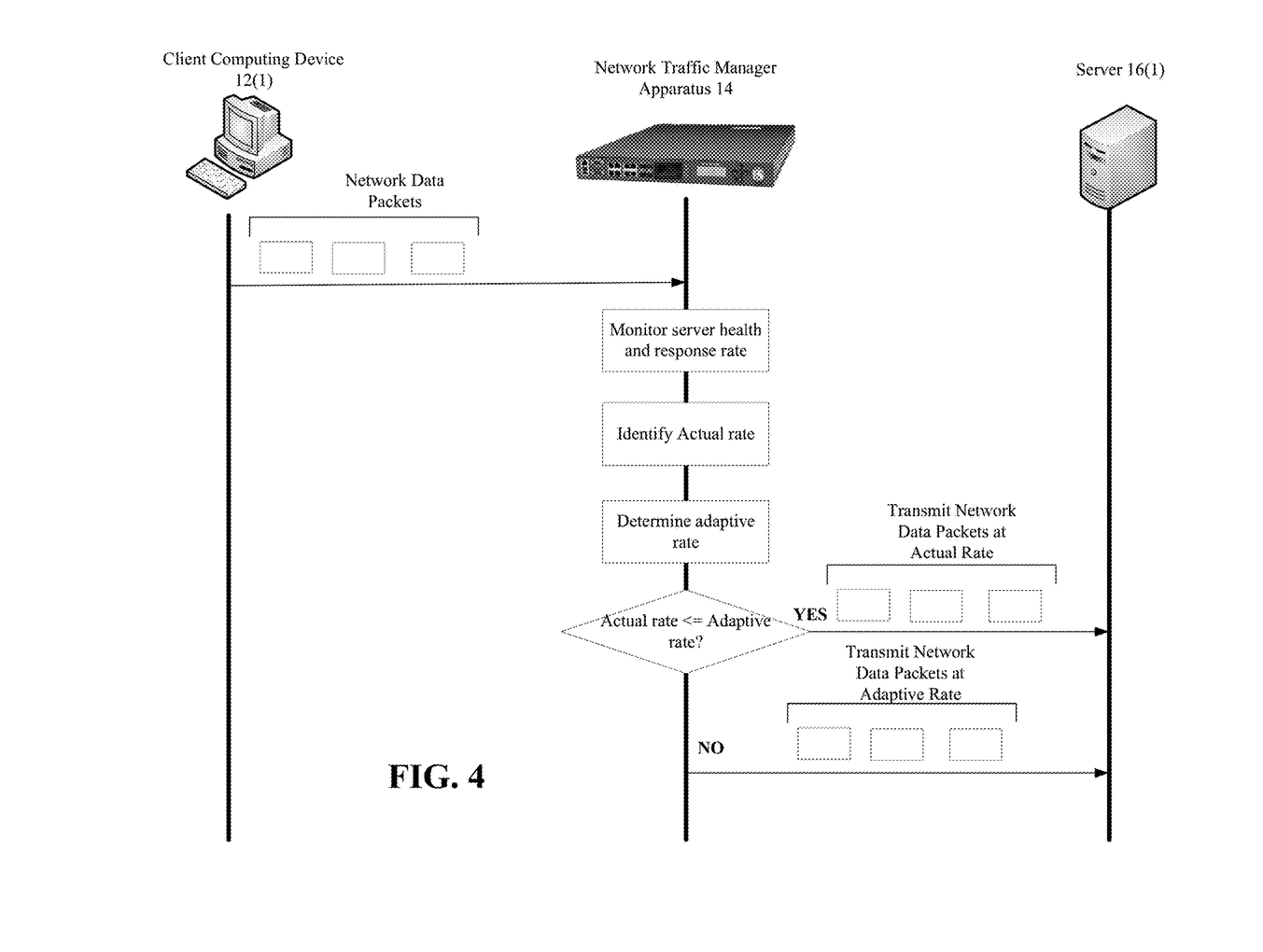
FIG. 4 is an exemplary sequence flow diagram of a method for configuring adaptive rate limit based on server health and statistics.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n) and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality of servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), or the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), or the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for configuring adaptive rate limit based on server health and statistics will now be described with reference to FIGS. 1-4. First in step 305, the network traffic manager apparatus 14 receives a plurality of network data packets from one of the plurality of client computing devices 12(1)-12(n), although the network traffic manager apparatus 14 can receive other types of data or information from other devices illustrated in the network environment in FIG. 1.

Next in step 310, the network traffic manager apparatus 14 identifies one of the plurality of servers 16(1)-16(n) to which the received plurality of network data packets is to be forwarded based on the contents of the received plurality of network data packets, although the network traffic manager apparatus 14 can also identify the server based on any load balancing and/or other traffic management techniques. Further in step 310, the network traffic manager apparatus 14 obtains the server health data from the identified server and in this example, the server health relates to CPU or processor utilization of the server, memory utilization of the server, peak response times, average response times, error rates and/or number of requests that can be processed per second. Alternatively, the server health data can include other types or amounts of information in other examples.

Next in step 315, the network traffic manager apparatus 14 determines a server impact value based on the obtained server health data, although the network traffic manager apparatus 14 can determine the server impact value based on other types or number of parameters. In this example, server impact value relates to a numerical value ranging between zero and hundred where zero illustrates no impact and hundred illustrates heavy impact and the impact increases in the ascending order from zero to hundred, although the definition of no impact and heavy impact could be in other orders, such as vice-versa in other examples. By way of example, the server impact value is determined by the formula 1/server health data where the server health data can be either individual or cumulative of all the obtained values of the server health data. Alternatively in another example, the server impact value can be taken as an average of server impact value computed for each of the obtained server health data metrics.

Next in step 320, the network traffic manager apparatus 14 compares the determined server impact value against a stored threshold impact value to determine when the identified server is healthy enough to process the received plurality of network data packets. In this example, when the determined server impact value is less than the stored threshold impact value, then the network traffic manager apparatus 14 determines that the identified server can process the received plurality of network data packets. In another example, when the network traffic manager apparatus 14 determines that determined impact value is greater than or equal to the stored threshold impact value, then the network traffic manager apparatus 14 determines that the identified server can not process the received plurality of network data packets. Accordingly, when the network traffic manager apparatus 14 determines that the determined server impact value is greater than or equal to the stored threshold impact value, then the Yes branch is taken back to step 310 where network traffic manager apparatus 14 identifies a new server and obtains the server health data. However, when the network traffic manager apparatus determines that the determined server impact value is not greater than or equal to the stored threshold impact value, then the No branch is taken to step 325.

In step 325, the network traffic manager apparatus 14 identifies a current rate at which the responses are being transmitted by the identified one of the plurality of servers 16(1)-16(n). In this example, the network traffic manager apparatus 14 can either obtain this information at the step 310 or can request the identified server of the plurality of servers 16(1)-16(n) to send the requested data, although the network traffic manager apparatus 14 can use other techniques to obtain this information.

Next in step 330, the network traffic manager apparatus 14 determines an adaptive rate limit value based on the current rate at which the responses are being transmitted by the identified one of the plurality of servers 16(1)-16(n) and the server health data obtained in step 310, although the network traffic manager apparatus 14 can determine the adaptive rate limit using other types and/or numbers of parameters. In this example, the adaptive rate limit relates to the rate at which the received plurality of network data packets can be transmitted to the identified server of the plurality of servers 16(1)-16(n).

Next in step 335, the network traffic manager apparatus 14 identifies the actual rate at which the network data packets currently are being transmitted to the identified one of plurality of servers 16(1)-16(n), although the network traffic manager apparatus can identify the actual rate in other manners.

Next in step 340, the network traffic manager apparatus 14 compares the identified actual rate to the determined adaptive rate limit to determine when the actual rate is less than or equal to the determined adaptive rate limit. In this example, the network traffic manager apparatus 14 makes the comparison to make sure that the performance of identified server of the plurality of servers 16(1)-16(n) does not reduce when all of the received plurality of network data packets are transmitted at once which could also result in network data packets being dropped. Accordingly, when the network traffic manager apparatus 14 determines that the actual rate is less than or equal to the determined adaptive rate, then the Yes branch is taken to step 345.

In step 345, the network traffic manager apparatus 14 transmits the received plurality of network data packets to the identified one of the plurality of servers 16(1)-16(n) at the actual rate and the exemplary method proceeds to step 305 where the network traffic manager apparatus 14 receives subsequent network data packets from the plurality of client computing devices 12(1)-12(n).

However if back in step 340, the network traffic manager apparatus determines that the actual rate is greater than the determined adaptive rate, then the No branch is taken to step 350.

In step 350, the network traffic manager apparatus 14 adjusts the actual rate to exactly match with the determined adaptive rate limit and proceeds to transmit the received plurality of network data packets at the adjusted actual rate or the adaptive rate and the exemplary flow proceeds to step 305 where the network traffic manager apparatus 14 receives subsequent network data packets from the plurality of client computing devices 12(1)-12(n).

Accordingly, as illustrated and described by way of the examples herein, this technology provides methods, non-transitory computer readable media and apparatuses that effectively assist with configuring adaptive rate limit based on server health and statistics. Using the techniques illustrated herein, the claimed technology is able to ensure that the ingress data packets rate does not exceed the server capacity thereby protecting the server against DoS/DDOS attacks.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for configuring adaptive rate limit based on server health and statistics implemented by a network traffic management system comprising one or more network traffic apparatuses, client devices, or server devices, the method comprising:
   obtaining server health data and a current response transmission rate associated with one of the plurality of servers;
   determining an adaptive rate limit based on the obtained server health data and the current response transmission rate prior to transmitting a plurality of network data packets;
   determining when an actual rate of transmission is greater than the determined adaptive rate limit; and
   transmitting the plurality of network data packets at the determined adaptive rate limit when the actual rate of transmission is determined to be greater than the determined adaptive rate limit.

2. The method as set forth in claim 1 further comprising determining a server impact value based on the obtained server health data and the current response transmission rate.

3. The method as set forth in claim 1 further comprising transmitting the plurality of network data packets at the actual rate of transmission when the actual rate of transmission is determined to be less than the determined adaptive rate limit.

4. The method as set forth in claim 2 further comprising determining when the determined server impact value is greater than a threshold server impact value.

5. The method as set forth in claim 4 further comprising identifying a new server when the determined server impact value is determined to be greater than the threshold server impact value.

6. A non-transitory computer readable medium having stored thereon instructions for configuring adaptive rate limit based on server health and statistics comprising executable code which when executed by one or more processors, causes the processors to:
   obtain server health data and a current response transmission rate associated with one of the plurality of servers;
   determine an adaptive rate limit based on the obtained server health data and the current response transmission rate prior to transmitting a plurality of network data packets;
   determine when an actual rate of transmission is greater than the determined adaptive rate limit; and
   transmit the plurality of network data packets at the determined adaptive rate limit when the actual rate of transmission is determined to be greater than the determined adaptive rate limit.

7. The medium as set forth in claim 6 further comprising determine a server impact value based on the obtained server health data and the current response transmission rate.

8. The medium as set forth in claim 6 further comprising transmit the plurality of network data packets at the actual rate of transmission when the actual rate of transmission is determined to be less than the determined adaptive rate limit.

9. The medium as set forth in claim 7 further comprising determine when the determined server impact value is greater than a threshold server impact value.

10. The medium as set forth in claim 9 further comprises identify a new server when the determined server impact value is determined to be greater than the threshold server impact value.

11. A network traffic manager apparatus, comprising memory comprising programmed instructions stored in the memory and one or more processors configured to be capable of executing the programmed instructions stored in the memory to:
   obtain server health data and a current response transmission rate associated with one of the plurality of servers;
   determine an adaptive rate limit based on the obtained server health data and the current response transmission rate prior to transmitting a plurality of network data packets;
   determine when an actual rate of transmission is greater than the determined adaptive rate limit; and
   transmit the plurality of network data packets at the determined adaptive rate limit when the actual rate of transmission is determined to be greater than the determined adaptive rate limit.

12. The device as set forth in claim 11 wherein the one or more processors are further configured to be capable of executing the programmed instructions stored in the memory to determine a server impact value based on the obtained server health data and the current response transmission rate.

13. The device as set forth in claim 11 wherein the one or more processors are further configured to be capable of executing the programmed instructions stored in the memory to transmit the plurality of network data packets at the actual rate of transmission when the actual rate of transmission is determined to be less than the determined adaptive rate limit.

14. The device as set forth in claim 12 wherein the one or more processors are further configured to be capable of executing the programmed instructions stored in the memory to determine when the determined server impact value is greater than a threshold server impact value.

15. The device as set forth in claim 14 wherein the one or more processors are further configured to be capable of executing the programmed instructions stored in the memory to identify a new server when the determined server impact value is determined to be greater than the threshold server impact value.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
   obtain server health data and a current response transmission rate associated with one of the plurality of servers;
   determine an adaptive rate limit based on the obtained server health data and the current response transmission rate prior to transmitting a plurality of network data packets;
   determine when an actual rate of transmission is greater than the determined adaptive rate limit; and transmit the plurality of network data packets at the determined adaptive rate limit when the actual rate of transmission is determined to be greater than the determined adaptive rate limit.

17. The network traffic management system of claim 16, wherein the one or more processors are further configured to be capable of executing the programmed instructions stored in the memory to determine a server impact value based on the obtained server health data and the current response transmission rate.

18. The network traffic management system of claim 16, wherein the one or more processors are further configured to be capable of executing the programmed instructions stored in the memory to transmit the plurality of network data packets at the actual rate of transmission when the actual rate of transmission is determined to be less than the determined adaptive rate limit.

19. The network traffic management system of claim 17 wherein the one or more processors are further configured to be capable of executing the programmed instructions stored in the memory to determine when the determined server impact value is greater than a threshold server impact value.

20. The network traffic management system of claim 19 wherein the one or more processors are further configured to be capable of executing the programmed instructions stored in the memory to identify a new server when the determined server impact value is determined to be greater than the threshold server impact value.

* * * * *